United States Patent [19]

Chappell

[11] 4,116,705

[45] Sep. 26, 1978

[54] DETOXIFICATION

[75] Inventor: Christopher Lee Chappell, Sale, England

[73] Assignee: Stablex AG, Zug, Switzerland

[21] Appl. No.: 695,670

[22] Filed: Jun. 14, 1976

Related U.S. Application Data

[63] Continuation of Ser. No. 474,754, May 30, 1974, abandoned.

[30] Foreign Application Priority Data

Jun. 1, 1973 [GB] United Kingdom ............... 26201/73

[51] Int. Cl.$^2$ ............................................. C04B 7/02
[52] U.S. Cl. ..................................... 106/90; 106/95; 106/96; 106/97; 106/DIG. 1
[58] Field of Search ................. 106/76, 90, 97, 95, 106/96, 64, DIG. 1

[56] References Cited

U.S. PATENT DOCUMENTS

| 2,517,993 | 8/1950 | Falco | 106/95 |
| 3,859,799 | 1/1975 | Jaco | 106/DIG. 1 |

*Primary Examiner*—J. Poer
*Attorney, Agent, or Firm*—Stevens, Davis, Miller & Mosher

[57] ABSTRACT

A process which comprises treating hazardous waste with an aluminium silicate or aluminosilicate and with a Portland cement in the presence of water to form a slurry and allowing the slurry to set into rock and a crystal matrix having encapsulated therein a hazardous waste and having a permeability of less than $1 \times 10^{-4}$ cm. sec$^{-1}$ and a compressive strength 28 days after preparation of 100 to 1000 psi.

9 Claims, No Drawings

DETOXIFICATION

This is a continuation of application Ser. No. 474,754 filed May 30, 1974, now abandoned.

The present invention concerns improvements in and relating to detoxification. In particular it is concerned with the treatment of hazardous wastes produced by industry and commence.

It has been found that the hazardous constituents of such wastes may be encapsulated in a crystal matrix and that they cannot substantially be removed therefrom by prolonged washing.

According to the present invention therefore a process is provided which comprises treating hazardous waste with an aluminium silicate or aluminosilicate and with a Portland cement in the presence of water to form a slurry and allowing the slurry to set into rock.

The slurry exists for a finite period of time and changes spontaneously at ordinary temperatures and pressures into the rock. The time required for the conversion of the slurry to the rock is a function of the water concentration present, the temperature, and the relative proportions of the silicate or aluminosilicate and the Portland cement. Thus, the time required for the slurry to set into rock can be reduced for example by increasing the proportion of the Portland cement or decreasing the proportion of water or decreasing the proportion of the hazardous waste. By varying any of these parameters slurries can be produced which require from 1 hour to several week to form into a hard rock. The formation of the slurry immediately improves the leaching characteristics of the hazardous waste. Samples of the slurry removed only a few minutes after its formation and subjected to leaching show that the leaching falls to 5% of that expected from the water washing of the hazardous waste concerned. Throughout this specification all percentages are on a weight for weight basis.

The rock is formed from the slurry by a process of carystallisation and the finished crystal structure contains all the ingredients from the reaction. Atoms, molecules or ions of the reactants form bonds with each other and with water molecules which are present. The rock is a hydrated crystal which increases in compression strength over a period of time and probably achieves its maximum strength after about six months although in fact there is very little increase in strength after 28 days. The atoms, molecules or ions of the hazardous waste are bound within the crystal matrix by chemical bonding or entrapment which is referred to as crystal capture.

The invention includes a crystal matrix having encapsulated therein a hazardous waste and having a permeability of less than $1 \times 10^{-4}$ cm. sec$^{-1}$ and a compressive strength 28 days after preparation of 100 to 1,000 psi. In general the permeability is from $1 \times 10^{-5}$ cm sec$^{-1}$ to $1 \times 10^{-8}$ cm sec$^{-1}$.

The permeability is measured by the method developed by E. Madgwick and described in Phil. Mag. S.7 Vol. 13 No 85, 1932, page 632. The compressive strength is measured by the method of British Standard 1610 in a Model A14 Clockhouse Triaxial Testing Machine (sold by Clockhouse ltd. of New Barnet, Hertfordshire, England).

The hazardous waste may contain aluminium, boron, cadmium, chromium, copper, iron, lead, manganese, nickel, tin, zinc, arsenic, antimony, barium, cobalt, gallium, hafnium, mercury, molybdenum, niobium, strontium, tantalum, thorium, titanium, vanadium, zirconium, selenium, or silver or a compound of any of the elements. It may contain anions such as fluoride, sulphate, phosphate, nitrate, nitrite, sulphite, cyanide, sulphide, thiocyanate, thiosulphate, ferricyanide or ferrocyanide and it may contain an acid, alkali, protein, carbohydrate, fat, drug, Prussian or Turnbulls blue, detergent, mineral oil, tar or grease.

Examples of wastes which may be treated by this invention are listed below:

Mining and Metallurgy Wastes e.g. mine tailings, drosses, especially those containing As, Cd, Cr, Cu, CN, Pb, Hg, Se, Zn or Sb.

Paint Wastes

Paint wastes stripped of solvent produced by heavy industry, especially the automobile industry.

Sulphide Dye Liquors

Inorganic Catalysts used in a wide range of industry, e.g.

petrochemical, general chemical or dyestuff industries.

Electrical and Electronic Industry Wastes such as printed circuit wastes, excluding chlorinated hydrocarbons.

Printing and Duplicating Wastes.

Electroplating and Metal Finishing Wastes.

Explosives Industry Wastes excluding organic wastes produced by this industry.

Latex Wastes and cyanide, mercury and zinc wastes produced by the rubber and plastics industry.

Electric Battery production wastes.

Textile wastes.

Cyanide, arsenic, chromium or other inorganic wastes produced by the petrochemical industry.

Leaded Petrol Sludges.

Pulp and Paper Industry Wastes.

Leather Industry Wastes.

Inorganic sludges produced by general chemical industry.

Asbestos Waste.

Scrubbing Liquors from incinerators and gas cleaning equipment.

Silts and dredgings from waterways.

Spent Oxides for gas purification.

Cement and Lime Industry Wastes, such as dusts collecting in electrostatic precipitators.

Cyanide Case Hardening Wastes.

Incineration Ashes e.g. fuel oil ashes from burning fuel oil in power stations, ash from burning domestic refuse and sewage sludge etc.

Sewage Sludges.

Smelting and Metal Refining Industry Wastes e.g. waste from metal smelting and refining, e.g. aluminium, zinc, copper or lead.

Iron and Steel Industry Wastes.

Sulphide Wastes e.g. calcium or sodium sulphide.

Acid and Alkaline Wastes.

The aluminosilicate may be, for example, vermiculite but is conveniently fly ash by which is meant the finely divided ash residue produced by the combustion of pulverized coal, which ash is carried off with the gases exhausted from the furnace in which the coal is burned and which is collected from those gases usually by means of suitable precipitation apparatus such as electrostatic precipitators.

Suitable Portland cements are, for example, those complying with British Standards 12(1958), 4027

(1966), 4248 (1968), 146 (1968), 4246 (1968) 1370 (1958) or 915 (1947).

The ratio of Portland cement to silicate or aluminosilicate is non-stoichiometric and for any given water content varies over the range 50:1 and 1:50. Variations within this range only effect the rate of setting and the ultimate compression strength of the rock. Thus, high properties of Portland cement (e.g. over 20%) promote rapid hardening and low proportions of Portland cement, (e.g. less than 5%) promote high ultimate strength.

The quantity of water required in the reaction may be, for example, up to 1000% of the total solids present. Concentrations lower than 20% are not sufficient to fully hydrate the product and the slurry is not formed. Above this figure of 20% the concentration of water increases the setting time of the slurry. Thus a slurry containing 75% water takes longer to reach a certain compression strength than does a slurry containing 50% water. In deducing these constraints no attempt has been made to prevent natural evaporation of water vapour to the atmosphere but neither has there been any attempt to promote it.

The concentration of hazardous waste which can be reacted with a particular ratio of Portland cement to silicate or aluminosilicate varies widely depending on the nature of the hazardous waste and can be up to 1000% of the weight of silicate or aluminosilicate and Portland cement combined. For any given mixture, increasing the concentration of any particular hazardous waste simply reduces the initial and ultimate compression strength of the resultant rock.

If the hazardous waste is neutral or alkaline, the silicate or aluminosilicate and the Portland cement are mixed and then the hazardous waste is added. If the hazardous waste is acidic it is desirable to mix it first with Portland cement and add the resulting mixture to the silicate or aluminosilicate. Water must be present during the reaction between the hazardous waste, the Portland cement and the silicate or aluminosilicate. The hazardous waste can however, be in the form of a liquid effluent, a semi-solid or a solid and if necessary therefore water must be added to the reactant mixture.

Elevation of temperature accelerates the rate of setting considerably and this decreases the ultimate strength of the rock. If desired, an oxide or hydroxide of aluminium or iron can be present in addition to the Portland cememt. If a mixture of fly ash and an alkali metal silicate is used then for a particular water content, the slurry sets more quickly, the resultant rock is harder and surprisingly any arsenic or calcium in the hazardous waste is more firmly encapsulated than if the alkali metal silicate is absent. The silicate or aluminosilicate is preferably used in dry powder form with a specific surface varying between 1500 sq. cms per ram to over 5000 sq. cms per gram and especially from 1500 sq. cms per gram to 6000 sq. cms per gram.

The rock produced according to this invention may be used, for example, for landfill, hard core, in the manufacture of constructional materials, in the preparation of grout, in the encapsulation of other wastes such as domestic refuse, or in land reclamation from disused mines, quarries, excavations, lakes, estuaries and the sea. Domestic wastes which do not lend themselves to the process of the invention may however, be buried in a mass of the slurry or rock and this will overcome the hazards of odour and rodents often associated with their disposal.

The invention is illustrated by the following Examples.

In the Examples Reactant A is a dry powdered Ordinary Portland cement (analysis: CaO 63.1%, $SiO_2$ 20.6%, $Al_2O_3$ 6.3%, $Fe_2O_3$ 3.6%; sulphate as $SO_4$ 2.0%) and Reactant B is a finely divided dry powdered aluminosilicate (100% less than 200 mesh) (analysis: $SiO_2$ 49.0%; $Al_2O_3$ 24.8%; $Fe_2O_3$ 10.2% and traces of carbon and sulphur).

The "leachate" is the solution produced by grinding 10g. of the hard rock-like material produced from the slurry into a fine powder and stirring with 100 ml. of distilled water at 20° C. for 1 hour in a magnetically stirred vessel and filtering through a Whatman No. 1 filter paper, unless otherwise stated.

EXAMPLE 1

A slurry was prepared by mixing 200 g of a finely divided (100% passes 200 mesh) aluminosilicate (analysis: $SiO_2$, 48.5%; $Al_2O_3$ 27.5%; $Fe_2O_3$, 8.0%) with 40 g of a dry powder (analysis: CaO, 64.0%; $SiO_2$, 20.5%; $Al_2O_3$ 5.5%) and 108 ml of water in which was dissolved 2 g each of Pb $(CH_3COO)_2$, Zn $(CH_3COO)_2$ $2H_2O$, Cd $(CH_3COO)_2$, $2H_2O$, $MnSO_4$ and $SnCL_2 2H_2O$, added, and mixed. The slurry produced set into rock in 24 hours. The materials were leached with water by stirring 10 g of the powdered rock in 100 ml of water at 20° C for 1 hour in a magnetically stirred vessel. The solids were removed by filtration through a Whatman No. 1 filter paper and the filtrate (leachate) analysed for the respective metal. Less than 0.1 ppm each of Cd, Zn, Mn and Pb was found in the respective leachates corresponding to less than 0.05% of each metal leached.

EXAMPLE 2

A slurry was prepared by mixing 200g of finely divided dry powdered aluminosilicate (100% less than 200 mesh) (analysis: $SiO_2$, 49.0%; $Al_2O_3$, 24.8%; $Fe_2O_3$, 10.2% and traces of carbon and sulphur) with 10 g of dry powder (analysis: CaO, 63.1%, $SiO_2$, 20.6%; $Al_2O_3$, 6.3%; $Fe_2O_3$, 3.6%; sulphate as $SO_4$, 2.0%) and 108 ml of distilled water in which is dissolved Xg of metal salt $MY_m nH_2O$ (X = 20.0 g, M = Zn and Cd, Y = $CH_3COO$, $m = 2$, $n = 2$; X = 20.0 g M = Pb, Y = $CH_3COO$, and $m = 2$, $n = 0$; X = 20.0 g M = Mn, Y = $SO_4$, $m = 1$, $n = 4$; X = 2.0 g, M = Sn, Y = Cl, $m = 2$ and $n = 2$; X = 11.7 g, M = CU, Y = $SO_4$, $m = 2$; $n = 5$; X = 13.4 g, M = Ni, Y = $SO_4$, $m = 1$, $n = 6$).

The resulting slurry set into a hard material in 7 days. The material was leached with water by stirring 10 g of powdered rock in 100 ml of water at 20° C. for one hour in a magnetically stirred vessel. The solids were removed by filtration through a Whatman No. 1 filter paper and the filtrate (leachate) analyzed for metal M.

| Metal M | ppm in leachate | % metal leached from rock |
| --- | --- | --- |
| Zn | 0.15 | 0.009 |
| Pb | 1.0 | 0.033 |
| Cd | 0.1 | 0.042 |
| Mn | 0.08 | 0.057 |
| Cu | 0.26 | 0.018 |
| Ni | less than 1.0 | less than 0.07 |

EXAMPLE 3

A slurry was prepared by mixing 100g. of reactant B with 100g. of Reactant A, 50 ml. of water and 400 g. of an arsenical waste produced by the tin smelting industry, (analysis: water 75%; arsenic in the arsenate form = 1.25% as As; ferric iron salts = 1.2% as Fe; manganese salts = 500 ppm as Mn; copper salts = 500 ppm as Cu; zinc salts = 2,250 ppm as Zn; nickel salts = 15 ppm as Ni; lead salts = 650 ppm as Pb; chromium salts = 5 ppm as Cr; cadmium salts = 65 ppm as Cd; tin salts = 400 ppm as Sn.).

The slurry set into a hard rock-like solid in 3 days, after 7 days the rock had a compression strength of 390 lbs./sq. inch, after 28 days the rock had a compressive strength of 750 lbs./sq. inch. The permeability of the rock was found to be $1 \times 10^{-7}$ cm. per second, after 11 days. The materials were leached after 3 days and the leachate contained less than 0.1 ppm each of Sn, Cd, Pb, Mn and Cr and less than 0.05 ppm each of Zn and Cu. 0.16 ppm of As and 0.5 ppm of Fe were found in the leachate.

EXAMPLE 4

100 g of water (analysis: water = 70.0%; sodium fluoride = 10.0% as NaF, calcium chloride = 20.0% as $CaCl_2$) and 70 g. of Reactant B and 15 g. of Reactant A were mixed into a thick slurry. The slurry set into a hard rock-like solid in 2 days. The materials were leached and the leachate contained 2.0 ppm of fluoride.

EXAMPLE 5

100 g. of an ash produced by burning fuel oil (analysis: carbon 65.0%; vanadium 2.7% as V; iron 2.0% as Fe, nickel = 2000 ppm as Ni) was mixed with 400 g of water, 50 g of Reactant B and 100 g. of Reactant A into a thick slurry which set hard in 4 days.

The materials were leached and the leachate was found to contain 0.18 ppm of vanadium as V, less than 0.1 ppm of Ni, and less than 0.05 ppm Fe.

EXAMPLE 6

100 g. of synthetic waste containing 10 g. of antimony oxide $Sb_2O_3$ and 90 g. of water was mixed with 120 g. of Reactant B and 30 g. of Reactant A into a thick slurry which set into a hard rock-like solid in one day.

The materials were leached and the leachate was found to contain less than 2 ppm of antimony as Sb.

EXAMPLE 7

100 g. of sodium silicate powder (analysis: $SiO_2$ = 76.7%; $Na_2O$ = 22.9%;) 100 g. of aluminosilicate (analysis $SiO_2$ = 48.0%; $Al_2O_3$ = 27.2%; $Fe_2O_3$ = 9.1%, CaO = 3.4%; MgO = 1.9%; $K_2O$ = 3.6%; $Na_2O$ = 3.8%) and 100 g. of an alkaline earth compound mixture (analysis: $CaCo_3$ = 69.0%, CaO = 25.0%, $SiO_2$ = 2.0%) were mixed with 150 g. of an electro-plating waste (analysis pH = 6.3, zinc = 2.2% as Zn, copper = 500 ppm as Cu; lead = 800 ppm as Pb; suspended solids = nil) and 100 g. of a dry white powdered waste produced in cement manufacture (analysis: CaO = 48.0%; Mg = 1.5%; $K_2O$ = 12.0%; $Na_2O$ = 2.0%) into a thick slurry. The slurry set into a hard solid in 24 hours.

The materials were leached and the leachate was found to contain less than 1 ppm of calcium and less than 0.05 ppm each of Zn, Cu and Pb.

EXAMPLE 8

100 g. of an oily waste (analysis: 94.1% water; 2.0% mineral oil; 3.0% alkali and alkaline earth salts) and 100 g. of Reactant B and 27 g. of Reactant A were mixed into a thick slurry which set into a hard solid in 3 days.

10 g. of the rock-like solid was ground to a fine powder and stirred with 100 g. of water in a magnetically stirred vessel for 1 hour at 20° C. The contents of the vessel were then centrifuged at 4,000 rpm for 5 minutes and the liquid decanted from the solids. The liquid was found to contain no mineral oil.

EXAMPLE 9

A strong smelling sulphide waste (analysis: sulphide = 4.1% as $S^{2-}$; sodium 5.9% as Na; water = 90%), 138 g, of Reactant B and 28 g. of Reactant A were mixed to a slurry. The slurry set into a hard rock-like material in 3 days. This material had no appreciable smell. The materials were leached and the leachate was found to contain less than 0.1 ppm of sulphide as $S^{2-}$.

EXAMPLE 10 100 g of electro-plating waste (analysis: pH = 11.4; total cyanide = 3.9% as CN; copper = 2.7%; suspended solids = nil; water content = 91.2%) was mixed with 15 g. of sodium hydrochloride solution (15%) available chloride), 223 g. of a dry gypsum waste, 134 g. of Reactant B and 34 g. of Reactant A to form a thick slurry.

The slurry set into a hard rock-like solid in 3 days. The materials were leached and the leachate was found to contain less than 0.01 ppm total cyanaide and 0.05 ppm of Cu.

EXAMPLE 11

100 g. of latex waste produced by the upholstery industry (analysis: pH 8.6: organic content = 12.0%; inorganic content = 1.0%; water = 87.0%) was mixed with 20 g. of waste and 25% sulphuric acid. 6 g. of hydrated lime was then added, followed by 40 g. of Reactant B and 40 g. of Reactant A and mixed into a thick slurry. The slurry hardened to a rock-like solid in 3 days. The materials were leached. The Chemical Oxygen Demand (COD) of the leachate was 20 milligrams per liter which allowed the low organic content of the leachate.

EXAMPLE 12

100 g of spent cobalt - molybdenum catalyst used in the oil refinery industry (an alumina based powder containing 5% cobalt as Co and 12% molybdenum as Mo. The elements were present as the oxides) was mixed with 170 g. of water, 170 g. of Reactant B and 40 g. of Reactant A into a thick slurry. The slurry set into a hard rock-like solid in one day. The materials were leached and the leachate was found to contain less than 0.02 ppm of cobalt as Co and less than 0.3 ppm as molybdenum.

EXAMPLE 13

A slurry was prepared by mixing 6.4 tonnes of a sludge produced by a metal finishing industry (analysis: dry solids at 105° C. = 10.0% w/w, pH = 10.3, Total cyanide = 20 ppm as CN, Total Chromium = 270 ppm as Cr, Copper = 160 ppm as Cu, Total iron salts = 7200 ppm as Fe, Lead = 340 ppm as Pb, Nickel = 3000 ppm as Ni, Zinc = 108 ppm as Nz) with 1.9 tonnes of Ordinary Portland Cement and 5.95 tonnes of fly ash. The slurry set into a hard rock-like material in 4 days. The materials were leached after 14 days and the leachate contains less than 0.01 ppm of cyanide, and less than 0.1 ppm each of iron, nickel, copper, lead, zinc and chromium.

EXAMPLE 14

100 g. of digested sewage sludge from Bolton sewage works (analysis: dry solids at 105° C. = 5.0%, water = 95.0%) and 30 g. of Reactant A and 30 g. of Reactant B were mixed into a slurry. The slurry set into a hard rock-like material in 4 days. The solid had no appreciable smell in contrast to the very strong smell of the untreated sewage sludge and after one year remained hard, inert and without smell.

I claim:

1. A process for detoxifying a hazardous essentially liquid waste which process comprises forming a flowable essentially aqueous slurry containing at least 20% water by mixing with the said waste while in essentially liquid form a material comprising Portland cement powder and an aluminum silicate powder or alumino-silicate powder or a mixture of said powders, said slurry thereafter setting into a detoxified frigid rock-like mass.

2. A process as defined in claim 1, in which the alumino-silicate is fly ash.

3. A process as defined in claim 1, in which the Portland cement is Ordinary Portland cement.

4. A process as defined in claim 1, in which an oxide or a hydroxide of aluminum of iron is also added to the said waste.

5. A process as defined in claim 1, in which the aluminum silicate or the alumino-silicate powder has a specific surface of at least 1500 sq. cms. per gram.

6. A process as defined in claim 5, in which the specific surface is from 1500 to 6000 sq. cm. per gram.

7. A process as defined in claim 1, in which the alumino-silicate is fly ash and is used together with a powdered alkali metal silicate.

8. A synthetic rock-like product when prepared by the process as defined in claim 1, and having a permeability of less than $1 \times 10^{-4}$ cm. sec.$^{-1}$ and a compressive strength 28 days after preparation of 100 to 1000 psi.

9. A synthetic rock-like product as defined in claim 8, wherein the permeability is from $1 \times 10^{-5}$ cm. sec.$^{-1}$ to $1 \times 10^{-8}$ cm. sec.$^{-1}$.

* * * * *

UNITED STATES PATENT AND TRADEMARK OFFICE
CERTIFICATE OF CORRECTION

PATENT NO. : 4,116,705
DATED : September 26, 1978
INVENTOR(S) : CHRISTOPHER LEE CHAPPELL It is certified that error appears in the above-identified patent and that said Letters Patent are hereby corrected as shown below:

Column 1, line 31, change "week" to read -- weeks --;

line 41, correct the spelling of "crystallisation";

line 64, change "ltd." to read -- Ltd. --.

Column 3, line 55, change "ram" to read -- gram --.

Column 6, line 21, change "$S^{2=}$" to read -- $S^{2-}$ --;

line 32, correct the spelling of "cyanide";

line 67, change "Nz" to read -- Zn --.

Column 8, line 2, change "frigid" to read -- rigid --;

line 8, change "of" (second occurrence) to read -- or --.

Signed and Sealed this

Twentieth Day of February 1979

[SEAL]

Attest:

RUTH C. MASON
Attesting Officer

DONALD W. BANNER
Commissioner of Patents and Trademarks